July 7, 1970  R. T. SCHMIDT ET AL  3,519,236
BALL TYPE POSITIONING COMPONENT
Filed Aug. 14, 1967  2 Sheets-Sheet 1
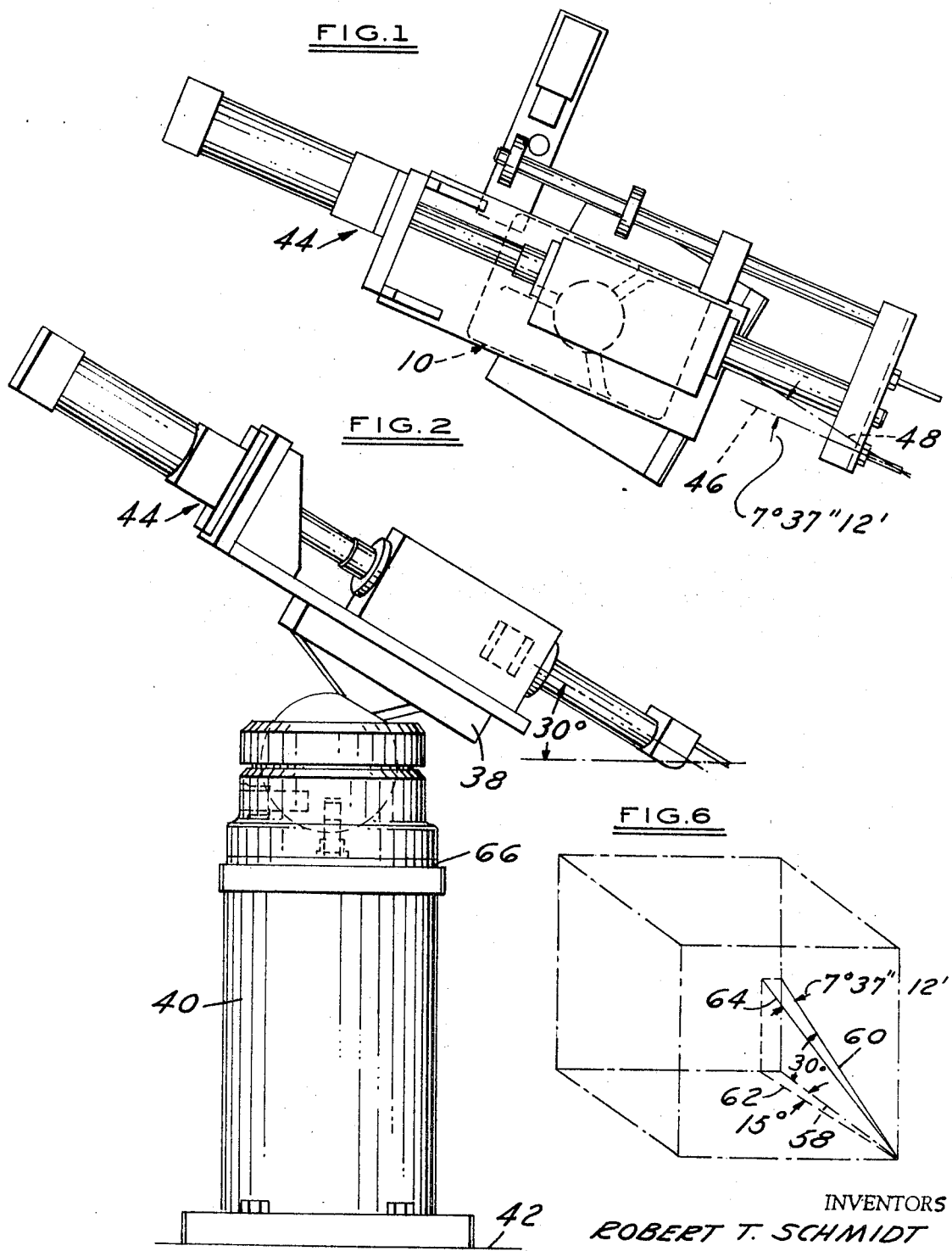
INVENTORS
ROBERT T. SCHMIDT
FREDERICK J. SICHENEDER
BY Whittemore, Hulbert
& Belknap
ATTORNEYS July 7, 1970   R. T. SCHMIDT ET AL   3,519,236
BALL TYPE POSITIONING COMPONENT
Filed Aug. 14, 1967
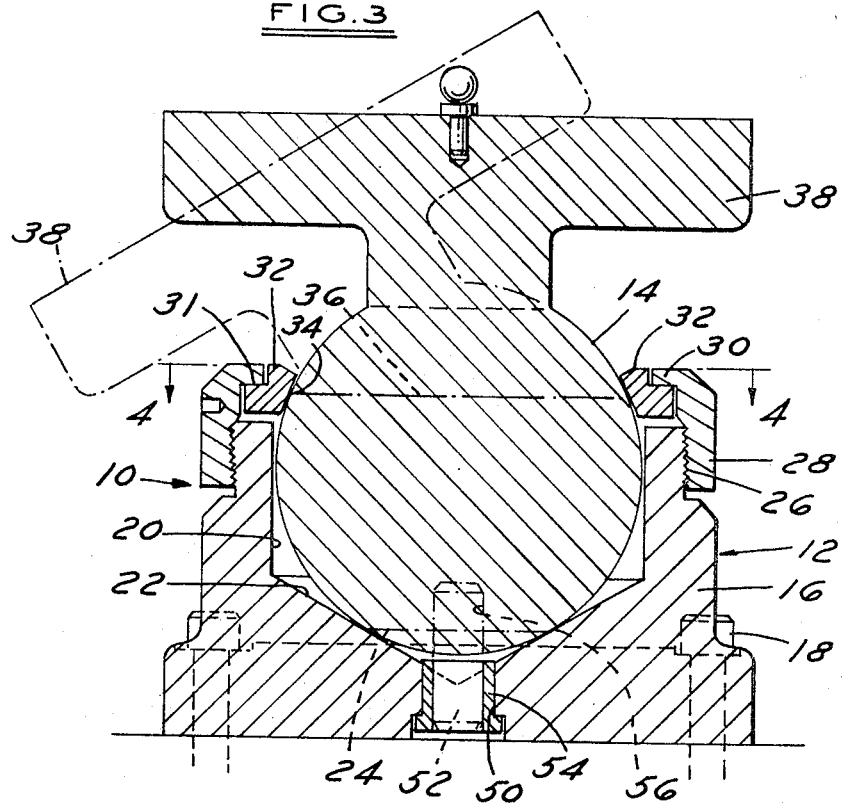
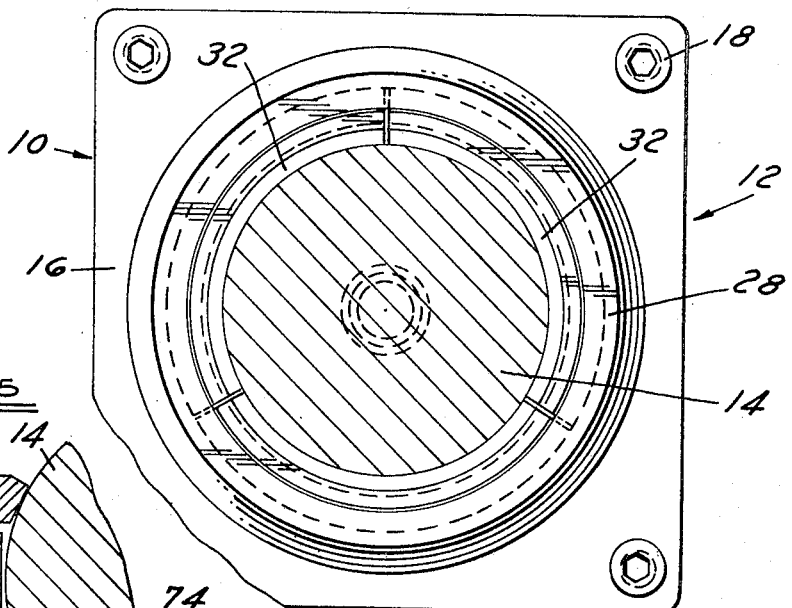
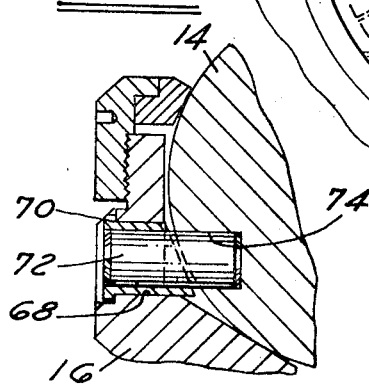
INVENTORS
ROBERT T. SCHMIDT
FREDERICK J. SICHENEDER
BY Whittemore Hulbert
& Belknap
ATTORNEYS United States Patent Office 3,519,236
Patented July 7, 1970

3,519,236
BALL TYPE POSITIONING COMPONENT
Robert T. Schmidt, Port Huron, and Frederick J. Sicheneder, Royal Oak, Mich., assignors to Medical Dynamics Corporation, Detroit, Mich., a corporation of Michigan
Filed Aug. 14, 1967, Ser. No. 660,273
Int. Cl. F16m 11/14
U.S. Cl. 248—181         2 Claims

ABSTRACT OF THE DISCLOSURE

The positioning component has a ball-shaped element which is rotatably received in a recess provided in a base member. The ball-shaped element carries a mounting platform upon which may be secured a tool, measuring instrument, production part and like structures which are to be oriented at a particular angle with respect to a plane of reference. Clamping means are provided for initially securing the ball-shaped element in the desired position. The ball-shaped element is permanently secured in this position by means of a pin which is received in an opening in the ball-shaped element, the opening being formed after the ball-shaped element has been positioned.

Background of the invention

Conventionally, fixtures for holding tools, gauges, production parts and the like at a predetermined angle with respect to a plane of reference have been custom-made to suit each new situation. The disadvantages of a custom-made fixture reside in the high manufacturing cost and the length of time necessary to produce the fixture.

Various ball-and-socket fixture devices have been proposed in the past. Such devices have relied upon friction to hold the ball in the proper position. Friction is not, of course, a positive locking means and such devices have tended to become misaligned during use.

The present invention provides what may be termed a ball-and-socket device which has the advantages of prior ball-and-socket devices but which is positively locked in position to avoid a misalignment during use.

Summary of the invention

A ball-type positioning component having a support structure for a device to be mounted thereon is provided. The component includes a spherical member and a holding structure for the spherical member. The holding structure includes first and second oppositely disposed conical surfaces. Means are provided to releasably frictionally clamp the spherical member between the conical surfaces after the spherical member has been oriented at a predetermined angle with respect to a selected plane of reference. After the spherical member has been clamped, it is positively locked in position to prevent relative movement of the spherical member with respect to the holding structure.

In the drawings:

FIG. 1 is a top plan view of the positioning component with a mechanical device mounted thereon forming one embodiment of the present invention;

FIG. 2 is a side elevational view of the structure illustrated in FIG. 1;

FIG. 3 is a side elevational view in section of the positioning component;

FIG. 4 is a sectonal view taken substantially along the line 4—4 of FIG. 3 looking in the direction of the arrows;

FIG. 5 is a sectional view illustrating an alternate embodiment of the positive locking means; and FIG. 6 is a diagrammatic view illustrating the technique for orienting the device mounted on the positioning component.

FIGS. 3 and 4 illustrate the structure of the ball-type positioning component 10. The component 10 comprises a holding structure 12 which receives a spherical member 14. The holding structure 12 includes a base element 16 which is suitably mounted on a support structure by means of bolts 18. The base 16 has a recess for receiving the spherical member. The recess comprises a first cylindrical portion 20 which terminates in a conical portion 22. The cylindrical portion 20 has a diameter slightly larger than the diameter of the spherical member to avoid contact with the spherical member. The spherical member rests upon the conical surface. As indicated by the dash line 24, the spherical member is in line contact with the conical surface 22.

The base 16 is externally threaded at 26, and receives an internally threaded annular ring 28. The ring 28 has an inwardly directed annular flange 30. Clamping segments 32 having notches 31 to receive the flange 30 are retained by the ring 28. Three segments 32 are provided in the illustrated embodiment. The segments 32 form an annular clamping ring. As will be noted, the inner surfaces 34 of the clamping segments 32 define a conical surface similar to the conical surface 22. When the threaded ring 28 is advanced towards the conical surface 22, the surfaces 34 clampingly engage the spherical member 14 in line contact as illustrated by the dash line 36.

The spherical member carries a mounting platform 38. The platform 38 functions to receive a mechanical device. The mechanical device may be of any of a wide variety of devices which are desired to be held at a particular angle with respect to a plane of reference. For example, the mechanical device may be a machine tool such as a drilling, reaming, or tapping unit. It may be a measuring instrument, a device for holding a part to be worked upon, or an electrical or chemical working head. Numerous other mechanical devices may be mounted on the unit 10.

The platform 38, as shown in dash lines in FIG. 3, may be tilted to any desired angle. After it has been tilted, the ring 28 is turned causing the spherical member 14 to be clamped in place. The line contact of the conical surfaces provides as much holding force as would, for example, a spherical recess which mated the shape of member 14. The conical clamping surface has the advantage, as compared with a spherical recess, of holding the member 14 in the exact position to which it is oriented. There are inherent irregularities in large surface areas which lead to some misalignment when used as clamping members. The use of a plurality of clamping segments 32 also aids in clamping the member 14 without causing misalignment. The segments 32 act as a floating clamping member which is self-centering with respect to the spherical member 14 and conical surface 22.

After the member 14 is clamped, it is permanently secured in place by means of a pin 52. An opening 50 is provided in the underside of the base 16. A bushing 54 is received in the opening. Upon clamping of member 14, a recess 56 is drilled and reamed in member 14. The bushing 54 serves as a guide during this operation. The pin 52 is then inserted.

The pin 52 provides a very strong holding force. It will be noted that pin 52 is subjected only to shear. The shear strength of the pin is, of course, very high. The bushing 54, which is a hardened member, provides additional shear support.

One procedure for setting up the device will now be described. Referring to FIGS. 1 and 2, it will be noted that the positioning component 10 is mounted on a support structure 40. The support structure 40 is illustratively secured to a floor 42. However, the support structure may be mounted on a wall or in any position desired. A measuring instrument 44 referred to as a "hole probe" is illustratively mounted on the platform 38. As will be noted, the hole probe 44 is oriented at a specific angle.

Referring to FIG. 1, it will be noted that the longitudinal axis of the hole probe 44 (illustrated by the dash line 46 which is parallel thereto) is positioned at an angle of 7°37′12″ with respect to a plane perpendicular to the plane of the drawing and defined by the dash line 48. The longitudinal axis is, of course, also angularly positioned with respect to a plane parallel to the plane of the drawings. However, the determination of this second angle is not necessary.

The first step involved in positioning the device at the desired angle is to orient the spherical member 14 with respect to horizontal and vertical planes of reference. This position is best illustrated in FIGS. 3 and 4. It will be noted that the upper surface of the platform 38 is parallel with the horizontal plane and that the platform is squared away with respect to the base 16. In theory, any desired initial position of the unit may be used. However, the illustrated initial position is the most convenient one.

The spherical member is then tilted to the desired position. The ring 28 is, of course, threaded outwardly at this time in order to permit tilting of the spherical member.

FIG. 6 illustrates one method for tilting the spherical member to the desired position. In order to position the device at the desired 7°37′12″, it is necessary to tilt the spherical member 30° upwardly in one vertical plane and 15° sidewardly in a horizontal plane which is perpendicular to the first plane. Dash line 58 represents the initial position of an axis of the member 14, line 60 the 30° tilt in the vertical plane, line 62 the 15° tilt in the horizontal plane, and line 64 the final position. The angle between lines 60 and 64 is 7°37′12″. This provides a check so that the operator will be sure that the setup is correct.

The ring member 28 is then threaded into engagement with the spherical member to firmly hold the spherical member in this position. The 7°37′12″ angle is checked at this point. The line contact between the spherical member and the conical surfaces 34 of the clamping segments 32 and the conical surface 22 of the recess in the base provide sufficient frictional engagement to hold the spherical member in place.

The recess 56 is then drilled and reamed in the spherical member through the opening in the bottom of the base. The dowel pin 52 is then inserted into this opening to permanently hold the spherical member in place.

Referring to FIG. 2, it will be noted that a spacer member 66 is provided between the device 10 and support 40. The spacer 66 is initially thicker than necessary in order that the hole probe 44 may be adjusted to the exact height desired. After the probe 44 is mounted, measurements are taken to determine how much stock should be taken off the spacer. The spacer is then removed and machined to the exact thickness necessary.

FIG. 5 illustrates an alternate means for securing the spherical member 14 in place. As will be noted, an opening 68 and bushing 70 are provided in the side wall of the base 16. The pin 72 is inserted through bushing 70 into recess 74. The method of forming recess 74 is the same as described in connection with recess 56. The FIG. 5 structure may be used when it is not possible to gain access to the underside of the base 16 or when additional holding strength is desired.

The positioning component which has been described incorporates a number of desirable features and presents several advantages. The device reduces engineering costs and eliminates the time-consuming development of compound surface brackets, and virtually eliminates the need for a compound angle calculator and it reduces drafting time because templates of the positioning component may be used by the draftsman.

The component is further advantageous in that it reduces the manufacturing cost of such fixtures. This results from the fact that compound angle surfaces do not have to be machined as they now are with conventional brackets. Boring of compound angle holes is eliminated. Further, checking, setup, and gauging time is materially reduced. In the event of an engineering mistake, it is only necessary to reset the device and drill a new hole for reception of the dowel pin. The device may be produced on a mass production basis, thus reducing manufacturing costs and providing a stock item which reduces delivery time to the buyer.

It will be appreciated that the platen or platform 38 may be made separately from the spherical member 14 or as an integral part of the spherical member 14 as illustrated in FIG. 3. If the platen 38 is made as a separate element such platen may be replaced from time to time when required. It should also be understood that a plurality of pull dowels or pins 52 may be utilized with each positioning component 10. The number of pull dowels 52 to be utilized with each positioning component 10 would be dependent upon the amount of shearing force to be encountered by the positioning component 10.

It should also be appreciated that in certain applications other types of locking means, other than the preferred pull dowels or pins 52, may be utilized for connecting the spherical member 14 to the holding structure 12. As an example the parts may be welded together. In some applications a graduated scale may be provided on the spherical member 14 or at other places on the positioning component 10 to help to locate the unit carried by the platen 38 at the proper angle.

What we claim as our invention is:

1. A ball-type positioning component comprising a support structure for a device to be mounted, a spherical member carrying the support structure, holding structure including first and second oppositely disposed conical surfaces, means to releasably frictionally clamp the spherical member between said surfaces with the support structure oriented at a predetermined angle to a selected plane of reference and with the spherical member in line engagement with said oppositely disposed surfaces, one of said oppositely disposed surfaces being defined by a plurality of segments of a circle, each of said segments having a surface portion for clamping engagement with the spherical member which segments together form one of the entire conical surfaces, a locking ring surrounding and holding said segments to form said segments into a substantially annular structure, and locking means comprising a pin for positive engagement with the holding structure and the spherical member to prevent relative movement thereof, said holding structure and spherical member having aligned opening means receiving said pin.

2. A device as defined in claim 1 and further characterized in the provision of a base having a recess therein, said recess defining the second conical surface, said locking ring being in threading engagement with said base for clamping the spherical member.

References Cited

UNITED STATES PATENTS

| | | | |
|---|---|---|---|
| 206,393 | 7/1878 | Ellinger | 248—181 |
| 659,532 | 10/1900 | Jordan | 248—181 |
| 916,286 | 3/1909 | Evans | 248—181 |
| 1,290,830 | 1/1919 | Giera | 248—181 |
| 1,677,889 | 7/1928 | Gairing | 248—181 |
| 1,751,895 | 3/1930 | Stewart | 248—181 |
| 2,095,381 | 10/1937 | Donaldson | 287—21 |
| 2,464,500 | 3/1949 | Graham | 248—181 |
| 2,671,704 | 3/1954 | Brown | 287—21 |
| 3,059,948 | 10/1962 | Thompson | 248—181 |
| 1,435,182 | 11/1922 | Shaw | 248—181 X |
| 3,374,974 | 3/1968 | Furrer et al. | 248—181 X |

FRANCIS K. ZUGEL, Primary Examiner

U.S. Cl. X.R.

287—21, 87